United States Patent
Sell

(10) Patent No.: US 9,630,347 B2
(45) Date of Patent: Apr. 25, 2017

(54) CUTTER HUB PIN DRIVE MECHANISM AND QUICK DISCONNECT HUB FOR AN UNDERFLUID PELLETIZER

(71) Applicant: Gala Industries, Inc., Eagle Rock, VA (US)

(72) Inventor: John A. Sell, Blue Ridge, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 246 days.

(21) Appl. No.: 14/205,738

(22) Filed: Mar. 12, 2014

(65) Prior Publication Data

US 2014/0271960 A1    Sep. 18, 2014

Related U.S. Application Data

(60) Provisional application No. 61/788,648, filed on Mar. 15, 2013.

(51) Int. Cl.
  *B29B 9/06*  (2006.01)
  *B26D 5/02*  (2006.01)

(52) U.S. Cl.
  CPC ............ *B29B 9/065* (2013.01); *B26D 5/02* (2013.01)

(58) Field of Classification Search
  CPC ........................................ B29B 9/065
  USPC ................................. 425/67, 196
  See application file for complete search history.

(56) References Cited

U.S. PATENT DOCUMENTS

| 3,196,487 A | 7/1965 | Snelling |
| 5,059,103 A | 10/1991 | Bruckmann et al. |
| 6,332,765 B1 * | 12/2001 | Spelleken ............ B29B 9/065 264/142 |
| 7,033,152 B2 | 4/2006 | Eloo et al. |
| 8,303,871 B2 | 11/2012 | Boothe et al. |
| 2003/0185923 A1 | 10/2003 | Martin |
| 2003/0213352 A1 * | 11/2003 | Konno ............... B29B 9/065 83/698.41 |

(Continued)

FOREIGN PATENT DOCUMENTS

CN          201461754          5/2010

*Primary Examiner* — James Mackey
(74) *Attorney, Agent, or Firm* — Jacobson Holman, PLLC.

(57) ABSTRACT

A cutter hub pin drive mechanism and a quick disconnect hub for a pelletizer and a pelletizer having a cutter hub pin drive mechanism are provided. The pelletizer has a cutter hub that includes a cutter hub holder which is engaged with the pelletizer shaft through a plurality of drive pins. The drive pins ride in drive pin channels formed by grooves cut into an inner surface of the cutter hub holder and aligned grooves formed in the outer surface of the forward end of the pelletizer shaft. By machining of grooves into the cutter hub holder and shaft to form channels that receive the drive pins, more precise engagement between the pelletizer shaft, cutter hub holder and drive pins is obtained, resulting in improved torque transmission from the shaft to the cutter hub. Also provided is a seal around the pelletizer shaft to prevent the egress of fines into the drive pin area which might otherwise interfere with the unobstructed movement of the cutter hub holder necessary to adjust blade position. Finally, a quick disconnect hub is provided by which the pelletizer shaft can be readily disconnected from the cutting assembly to facilitate the removal of agglomerated polymer in the cutting chamber.

27 Claims, 8 Drawing Sheets

ONE EMBODIMENT ASSEMBLY

(56) References Cited

U.S. PATENT DOCUMENTS

2004/0081716 A1     4/2004  Eloo et al.
2009/0269428 A1*   10/2009  Holmes .................. B29B 9/065
                                                              425/6
2010/0330216 A1    12/2010  Hurt et al.

* cited by examiner

PRIOR ART ASSEMBLY

ANOTHER PRIOR ART ASSEMBLY

ONE EMBODIMENT ASSEMBLY

ANOTHER EMBODIMENT ASSEMBLY

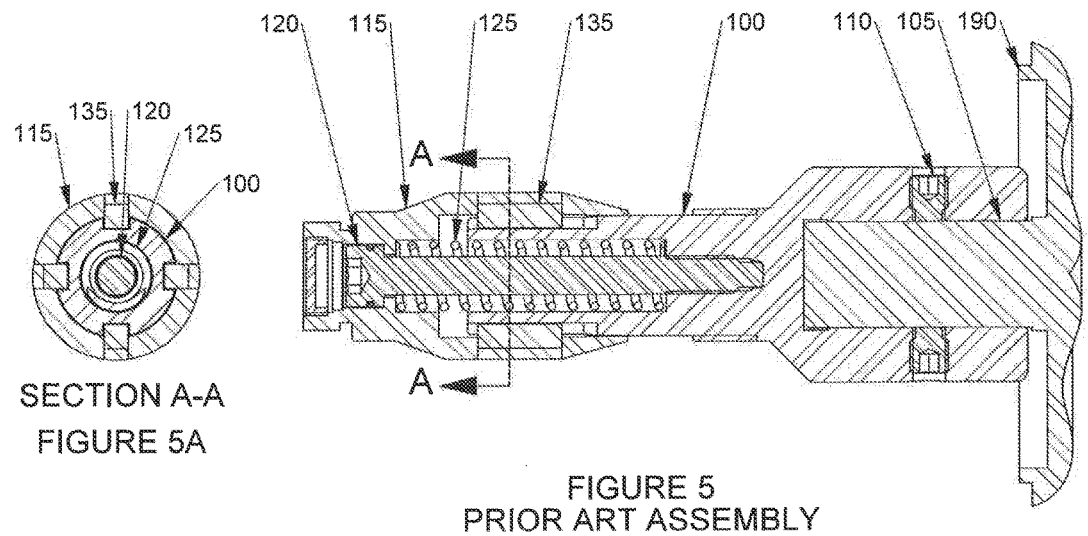
FIGURE 5
PRIOR ART ASSEMBLY
SECTION A-A
FIGURE 5A
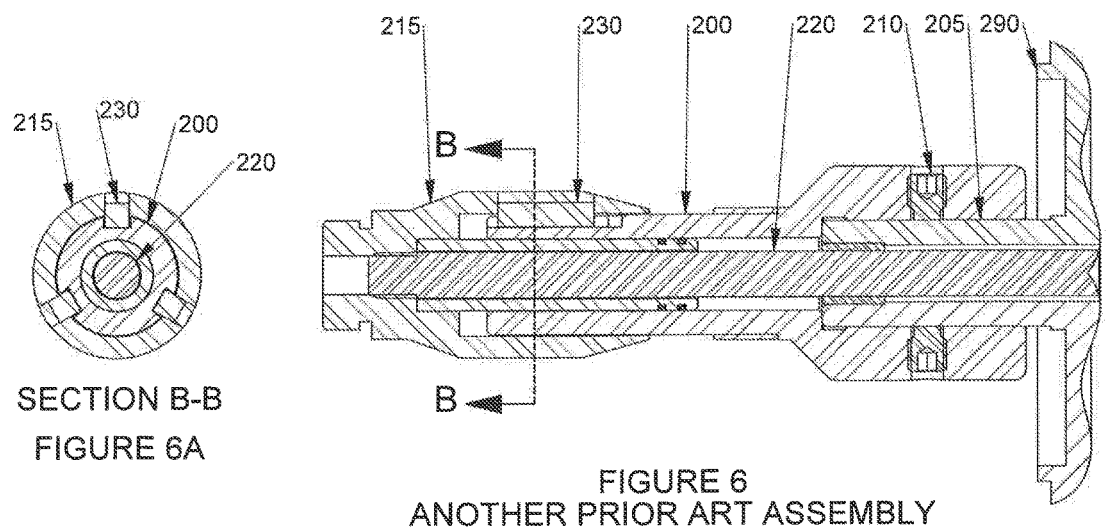
FIGURE 6
ANOTHER PRIOR ART ASSEMBLY
SECTION B-B
FIGURE 6A

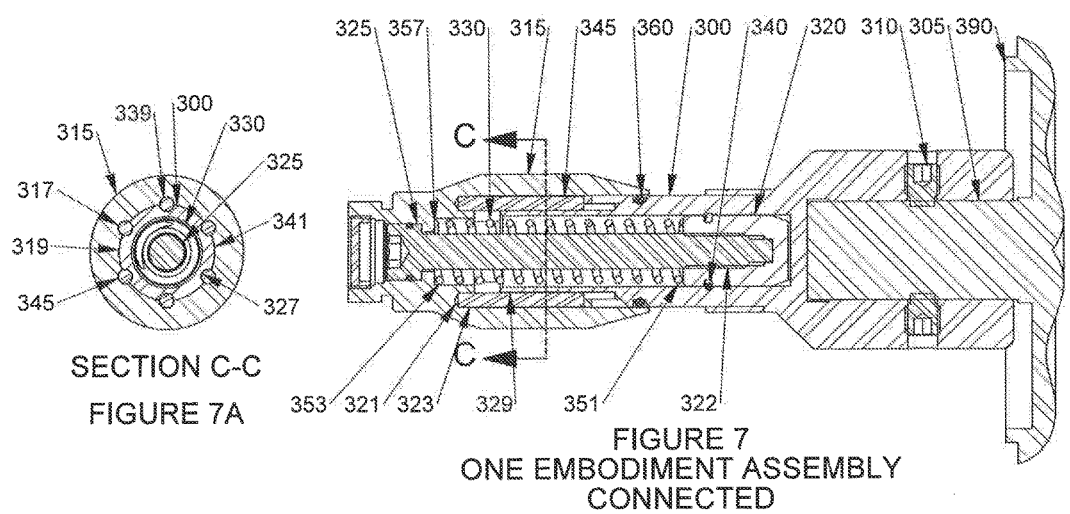
SECTION C-C
FIGURE 7A
FIGURE 7
ONE EMBODIMENT ASSEMBLY
CONNECTED
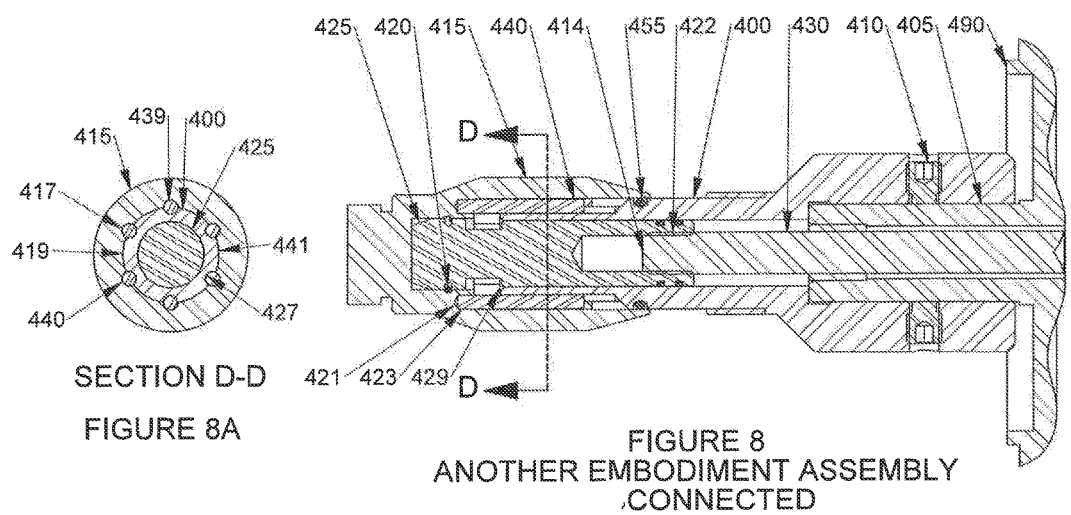
SECTION D-D
FIGURE 8A
FIGURE 8
ANOTHER EMBODIMENT ASSEMBLY
CONNECTED

ONE EMBODIMENT ASSEMBLY
DISCONNECTED

ANOTHER EMBODIMENT ASSEMBLY
DISCONNECTED

ANOTHER EMBODIMENT ASSEMBLY

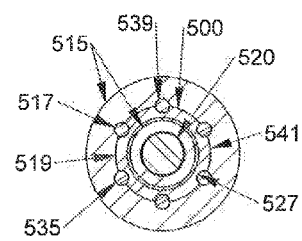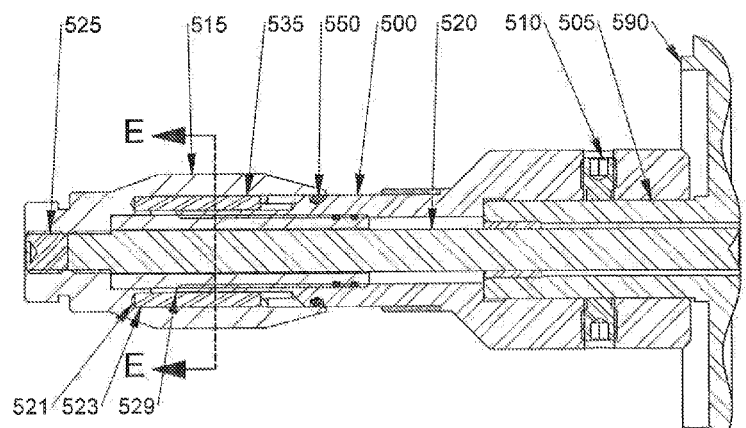
SECTION E-E
FIGURE 12A
FIGURE 12
ANOTHER EMBODIMENT ASSEMBLY
CONNECTED
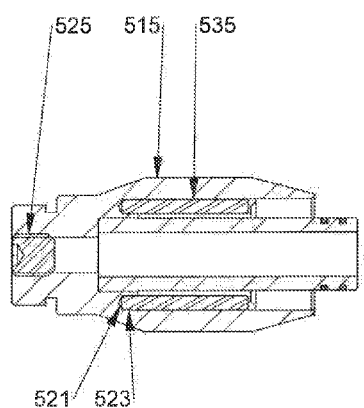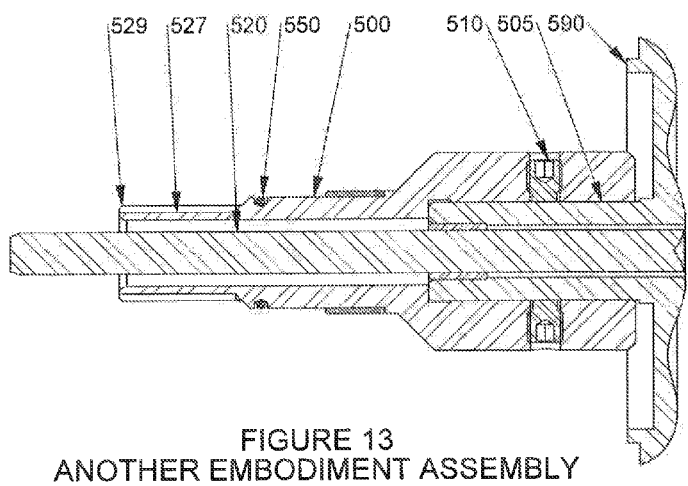
FIGURE 13
ANOTHER EMBODIMENT ASSEMBLY
DISCONNECTED

CUTTER HUB HOLDER

PELLETIZER SHAFT

PELLETIZER SHAFT AND CUTTER
HUB HOLDER ASSEMBLED

US 9,630,347 B2

CUTTER HUB PIN DRIVE MECHANISM AND QUICK DISCONNECT HUB FOR AN UNDERFLUID PELLETIZER

This application is based upon provisional application, U.S. Ser. No. 61/788,648, filed Mar. 15, 2013, and hereby claims the priority thereof to which this application is entitled.

BACKGROUND OF THE INVENTION

Field of the Invention

The present invention is related to the field of pelletizers for production of pellets from polymer containing materials and other pelletizable formulations.

Description of the Related Art

Various pelletizer designs are disclosed in U.S. Pat. No. 5,059,103 ("the '103 patent"), U.S. Pat. No. 7,033,152 ("the '152 patent"), and U.S. Pat. No. 8,303,871 ("the '871 patent"), all of which patents are co-owned by the applicant and assignee of the instant application. The disclosures of the '103 patent, the '152 patent and the '871 patent are relevant to the subject matter of the instant application and therefore these three patents are hereby expressly incorporated herein by reference as if fully set forth in the instant application.

The prior art pelletizer design shown in FIGS. 1, 5 and 5A utilizes a pelletizer shaft 100 that is bolted to the motor shaft 105 of motor 190 with set screws 110. A cutter hub holder 115 is retained on the pelletizer shaft 100 with a bolt 120 and has a spring 125 for adjustment as the blades 130 wear down. This cutter hub holder 115 has multiple keys 135, typically 2 to 4 keys are used, which are welded in place to slide in key slots that are cut in the pelletizer shaft 100. Several problems with this design may arise.

First, the keys 135 can sometimes break loose from the weld that holds them in the cutter hub holder 115. Further, due to the nature of welding, the keys may not be precisely positioned to exactly match the key slots in the pelletizer shaft, resulting in less than the desired amount of surface contact between each of the keys and their corresponding slot. As a result, torque that is transmitted from the cutter hub to the pelletizer shaft during operation of the pelletizer may be borne by less than all of the keys, creating even higher stresses on the torque-bearing keys which can impair pelletizer performance and/or lead to breakage of the keys.

Second, the keys can wear into the sides of the key slots in the pelletizer shaft 100. Since they do not extend beyond the end of the pelletizer shaft 100, the keys can become caught within notches formed by the wear of the keys against the sides of the key slots. The wear pattern of these notches creates a "hook" that can trap the keys and prevent the spring 125 from pushing the cutter hub holder 115 forward to compensate for blade wear, causing poor cutting performance and thus poor pellet quality.

Third, fines that are generated when cutting the polymer strands with the blades can accumulate and pack within the key slots, also locking the cutter hub holder 115 in place and preventing movement thereof as the blades 130 wear down or when new blades are installed. Fines packed in the key slots can also produce cross contamination from one pelletizing run to the next.

Another prior art pelletizer design is shown in FIGS. 2, 6 and 6A and utilizes a pelletizer shaft 200 that is bolted to the motor shaft 205 of motor 290 with set screws 210. A cutter hub holder 215 is retained on the pelletizer shaft 200 by threaded engagement with the motion rod 220 which provides for adjustment of cutter hub position as the blades 225 wear down.

Like the design shown in FIG. 1, the FIG. 2 cutter hub holder 215 has multiple keys 230 welded thereto that can sometimes break loose from the weld holding them in the cutter hub holder 215. These keys can also wear into the sides of the key slots in the pelletizer shaft 200 since they do not extend out of the end of the pelletizer shaft 200, again creating the "hook" wear pattern that requires more effort to push the cutter hub holder 215 forward to compensate for blade 225 wear and causing poor cutting performance and thus poor pellet quality. Also, like the FIG. 1 design, fines that are generated from trying to cut the polymer strands by the blades can accumulate and pack within the key slots, preventing movement of the cutter hub holder 215.

An additional problem with both the FIG. 1 and FIG. 2 designs is that the cutting area within the cutting chamber or water box can become agglomerated with molten polymer or polymer blend material, allowing the polymer to wrap around the cutter hub and blades and flow either up the slurry outlet piping 150, 245 or down the water or fluid inlet piping 145, 240, or into both the inlet and the outlet. Simultaneously, the molten polymer can begin to quickly solidify before the operator can safely get to the pelletizer and unclamp the pelletizer from the cutting chamber or water box. The pelletizer, now being held in position by the solidifying polymer, cannot be easily removed from the cutting chamber 155, 250. As used herein, "polymer" is intended to refer to both pure polymer melts as well as extrudable material that contains a mixture of one or more polymers and other non-polymer material such as biomaterials, additives, and the like. Also, the terms "water box" and "cutting chamber" are used interchangeably herein.

There is no easy way with either the FIG. 1 or the FIG. 2 design to remove the cutter hub 140, 235 or the cutter hub holder 115, 215 from the pelletizer shaft 100, 200 so the operator can remove the pelletizer and get into the cutting chamber to remove the agglomerated polymer and clear the cutter blades of any obstructions so to be able to re-start the pelletizer and process line. Ideally, in the case of polymer agglomeration the operator should proceed to take certain disassembly steps such as unbolting the cutting chamber 155, 250 and die plate 160, 255 from the upstream equipment to clean out the polymer wrap. Alternatively, in the FIG. 2 design, the operator can remove the fan cover (not shown) on the back of the motor 290, disconnect the motion rod 220 from the motion rod adjuster (not shown) and then unscrew the motion rod 220 from the cutter hub holder 215. If the motion rod is not disconnected from the correct point, however, then the forward travel must be readjusted when reassembling the components. If the forward travel is not adjusted correctly, the operator could, in the best case, not get full blade life out of the blades 225, or in the worst case, the operator could run the cutter hub 235 into the face of the die 255 as the blades 225 wear down, which will damage the face of the die 255 requiring that the die be replaced or repaired.

Unfortunately, rather than undertaking disassembly procedures such as those just described, many operators will try to introduce pry bars to increase leverage to get the pelletizer separated from the cutting chamber. The heavy duty pry bars can damage the precision mating surfaces of the pelletizer front-end and the connecting flange of the cutting chamber. Further, the pry bars put very high stresses on the various components on the front end and throughout the pelletizer and its motor. In some extreme cases, operators or maintenance staff have brought in a forklift truck to pull the pelletizer away from the cutting chamber. Needless to say, such forceful separation can severely damage the pelletizer and its components, creating costly failures, extensive down time awaiting replacement parts to repair the damage, and/or safety hazards.

Hence, there is a need for a cutter hub drive mechanism that produces better torque transmission from the pelletizer shaft to the cutter hub while reducing the likelihood of drive mechanism breakage and drive key entrapment arising from wear patterns formed in the pelletizer shaft by the keys. In addition, there is a need for a structure to prevent the entry of fines into the drive key area, and also a process by which the removal of agglomerated polymer within the cutting chamber is shortened and simplified.

SUMMARY OF THE INVENTION

In view of the foregoing, the present invention is directed to a cutter hub pin drive mechanism for an underfluid pelletizer having a pelletizer shaft and a cutter hub. The cutter hub includes a cutter hub holder having a plurality of longitudinally extending grooves formed on an inner surface thereof. The forward end of the pelletizer shaft fits within the cutter hub holder and has an outer surface with a corresponding plurality of longitudinally extending grooves cut therein in longitudinal alignment with the grooves in the cutter hub holder. The respectively aligned cutter hub holder grooves and pelletizer shaft grooves form a plurality of longitudinally extending drive pin channels. A plurality of drive pins are received within the drive pin channels, respectively. Torque is transmitted from the pelletizer shaft to the cutter hub holder and cutter hub by the drive pins which are captured within the drive pin channels. The drive pins are preferably held within the cutter hub holder by retaining the ends of the drive pins nearest the cutter hub in holes formed in the bottom of the cutter hub holder, preferably by a press fit. Other holding mechanisms could be used such as glue or other adhesive, brazing, and the like.

The present invention also includes a quick disconnect hub for a pelletizer or a cutter hub pin drive mechanism. The quick disconnect hub is configured to secure the pelletizer shaft to the cutter hub holder with a retaining element. To separate the cutting assembly from the pelletizer with minimal effort in order to clear the cutting chamber from agglomerated polymer and the like, the quick disconnect hub is separated from the retaining element, allowing the pelletizer shaft to be pulled out of the cutter hub holder while the cutter hub remains in the cutting chamber. Once the chamber is cleared, the pelletizer shaft can be easily reconnected to the cutter hub holder by resecuring the quick disconnect hub with the original or a replacement retaining element.

The present invention is also directed to an underfluid pelletizer for extruding and cutting a process melt into pellets, the pelletizer including a pelletizer shaft and a die plate with a plurality of extrusion orifices formed therein through which the process melt is carried from the die plate to a cutting face on a downstream side of the die plate. A rotary cutter blade assembly, in opposed relation to the cutting face, has a cutter hub and at least one cutter blade mounted on the hub. The cutter blade assembly, which is driven by the pelletizer shaft using a cutter hub pin drive mechanism, is capable of moving in a plane generally parallel to and closely adjacent the cutting face to cut strands of process melt extruded through the orifices into pellets.

The pelletizer further includes a cutting chamber that encloses the cutting face and cutter blade assembly. The cutting chamber includes a fluid inlet for introducing cooling fluid into the cutting chamber and an outlet for discharge of fluid and pellets entrained in the fluid. In an underwater pelletizer, the fluid is typically water or a fluid mix containing water but other fluids may be used. Therefore, the term underfluid pelletizer is intended to include all pelletizers operating with a fluid in the cutting chamber.

The cutter hub pin drive mechanism of the cutter blade assembly includes a cutter hub holder having a plurality of longitudinally extending grooves formed on an inner surface thereof. The forward end of the pelletizer shaft fits within the cutter hub holder and has an outer surface with a corresponding plurality of longitudinally extending grooves cut therein in longitudinal alignment with the grooves in the cutter hub holder. The respectively aligned cutter hub holder grooves and pelletizer shaft grooves form a plurality of longitudinally extending drive pin channels. A plurality of drive pins are received within the drive pin channels, respectively, with torque being transmitted from the pelletizer shaft to the cutter hub holder and cutter hub by the drive pins as captured within the drive pin channels. The drive pins are preferably held within the cutter hub holder by retaining the ends of the drive pins nearest the cutter hub in holes formed in the bottom of the cutter hub holder, preferably by a press fit although other holding mechanisms such as adhesives, brazing, and the like, could be used. A sealing member is positioned around the pelletizer shaft and under the cutter hub holder to prevent the egress of fines into the drive pin channels.

The pelletizer may further include a quick disconnect hub configured to secure the pelletizer shaft to the cutter blade assembly through the cutter hub holder with a retaining element. To separate the cutter blade assembly from the pelletizer shaft with minimal effort in order to clear the cutting chamber from agglomerated polymer and the like, the quick disconnect hub with the retaining element is separated from the pelletizer shaft, allowing the pelletizer shaft to be pulled out of the cutter hub holder while the cutter hub assembly remains in the cutting chamber. Once the chamber is cleared, the pelletizer shaft can be easily reconnected to the cutter hub holder and cutter hub assembly by resecuring the quick disconnect hub with the original or a replacement retaining element.

Accordingly, it is an object of the present invention to provide a underfluid pelletizer having an improved cutter hub drive mechanism.

Another object of the present invention is to provide a cutter hub drive mechanism for an underfluid pelletizer that provides a better distribution of the forces of torque along the pelletizer shaft components thus reducing wear and subsequent premature failures.

Still another object of the present invention is to provide a cutter hub pin drive mechanism for a pelletizer in accordance with the preceding object in which drive pins are used that extend beyond the forward end of the pelletizer shaft and reduce wear thereon to keep the surfaces that slide against one another smoother so blade adjustment will remain reliable and irregular wear patterns that impede forward adjusting movement of the cutting blades are reduced.

Yet another object of the present invention is to provide a cutter hub pin drive mechanism for a pelletizer in accordance with the preceding objects in which grooves complementary to the shape of the drive pins are machined into abutting surfaces of the cutter hub holder and pelletizer shaft to form drive pin channels having improved precision to increase the effective surface contact area of the interface between these components and the drive pins fitted in the channels.

A further object of the present invention to provide a cutter hub pin drive mechanism for a pelletizer in accordance with the preceding objects that has at least one sealing feature to reduce or eliminate the egress of fines or very small pellets into the drive pin area, and thus help to prolong the performance of the pelletizing cutting features and/or to help reduce any cross contamination of such entrapped materials, from one pelletizing run to the next.

A still further object of the present invention to provide a pelletizer in accordance with the preceding objects which includes a quick disconnect hub that simplifies the process needed to address the problems that arise when polymer agglomerates in the cutting chamber, as can occur from time-to-time with underfluid pelletizing, requiring that the pelletizer be disengaged from the cutting chamber.

Yet another object of the present invention is to provide a pelletizer with a quick disconnect hub in accordance with the preceding object in which the front area of the pelletizer within the cutting chamber is designed to be much more easily and quickly disconnected from the cutter hub holder in the event of an agglomeration of extruded materials within the cutting chamber.

It is still another object of the invention to provide a pelletizer with quick disconnect hub in accordance with the preceding two objects in which the disconnect device is not complex in structure and can be manufactured at low cost but yet efficiently enables the pelletizer to be disconnected from the cutting chamber easily and quickly without the need for complicated or lengthy disassembly procedures.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 5 is a sectional view of the cutter hub holder and pelletizer shaft components of the first prior art embodiment shown in FIG. 1.

FIG. 5A is a sectional view taken along line A-A of FIG. 5.

FIG. 6 is a sectional view of the cutter hub holder, pelletizer shaft and motion rod components of the second prior art embodiment shown in FIG. 2.

FIG. 6A is a sectional view taken along line B-B of FIG. 6.

FIG. 7 is an assembled sectional view of the cutter hub holder, pelletizer shaft and quick disconnect hub components of the first embodiment of the present invention shown in FIG. 3.

FIG. 7A is a sectional view taken along line C-C of FIG. 7.

FIG. 8 is an assembled sectional view of the cutter hub holder, pelletizer shaft and motion rod, and quick disconnect hub components of the second embodiment of the present invention shown in FIG. 4.

FIG. 8A is a sectional view taken along line D-D of FIG. 8.

FIG. 12 is an assembled sectional view of the cutter hub holder and pelletizer shaft and motion rod components of the third embodiment of the present invention shown in FIG. 11.

FIG. 12A is a sectional view taken along line E-E of FIG. 12.

FIG. 13 is a sectional view of the cutter hub holder and pelletizer shaft and motion rod components of the third embodiment of the present invention shown in FIGS. 11 and 12 when the components are disconnected from one another.

DETAILED DESCRIPTION OF THE PREFERRED EMBODIMENTS

Figure 1:
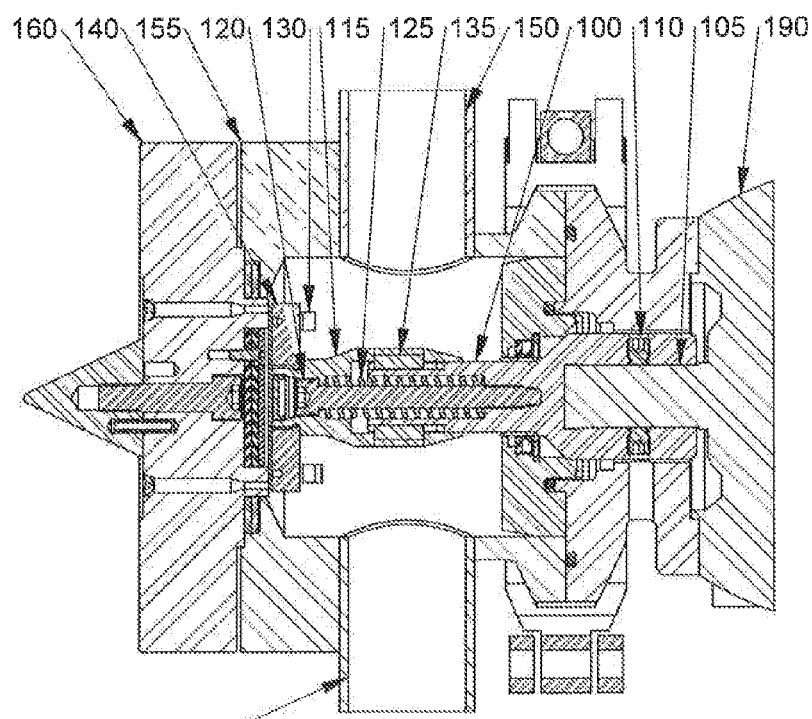
FIG. 1 is a partial section view showing the relation on a prior art assembly of the cutter hub, blades, die plate, cutting chamber and front of the pelletizer motor.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

A first embodiment of the present invention is shown in FIGS. 3, 7, 7A and 9. The pelletizer, generally designated by reference numeral 30, includes a pelletizer shaft 300 coupled to a motor shaft 305, a cutter hub 350 with cutter blades 335, a cutter hub holder 315, a cutting chamber 355, a die plate 359, a cutter hub pin drive mechanism including a plurality of drive pins 345, a sealing member 360, a disconnect hub 320 and a retainer ring 340. The pelletizer shaft 300 is bolted to the motor shaft 305 of motor 390 with set screws 310. The cutter hub holder 315 is secured to the disconnect hub 320 with a bolt 325. A spring 330 is provided for adjustment of the cutter hub holder 315 and blade position as the blades 335 wear.

Figure 2:
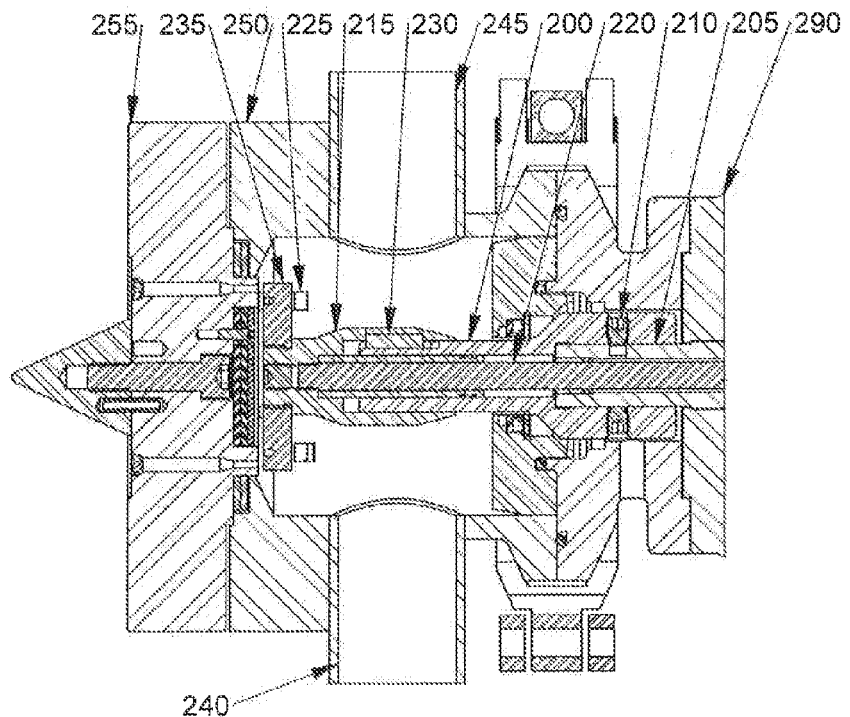
FIG. 2 is a partial section view showing the relation on another prior art assembly of the cutter hub, blades, die plate, cutting chamber, and front of the pelletizer motor with motion rod.
Figure 3:
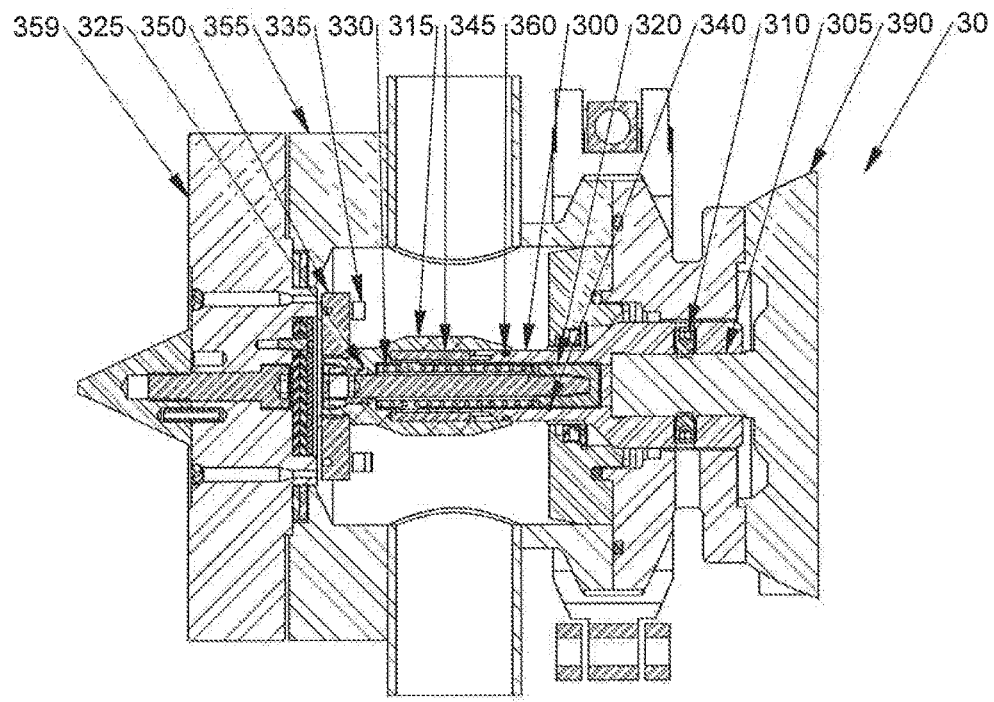
FIG. 3 is a partial section view of a first embodiment of a pelletizer in accordance with the present invention showing the relation of the cutter hub, blades, die plate, cutting chamber, front of the pelletizer motor and quick disconnect hub.
Figure 4:
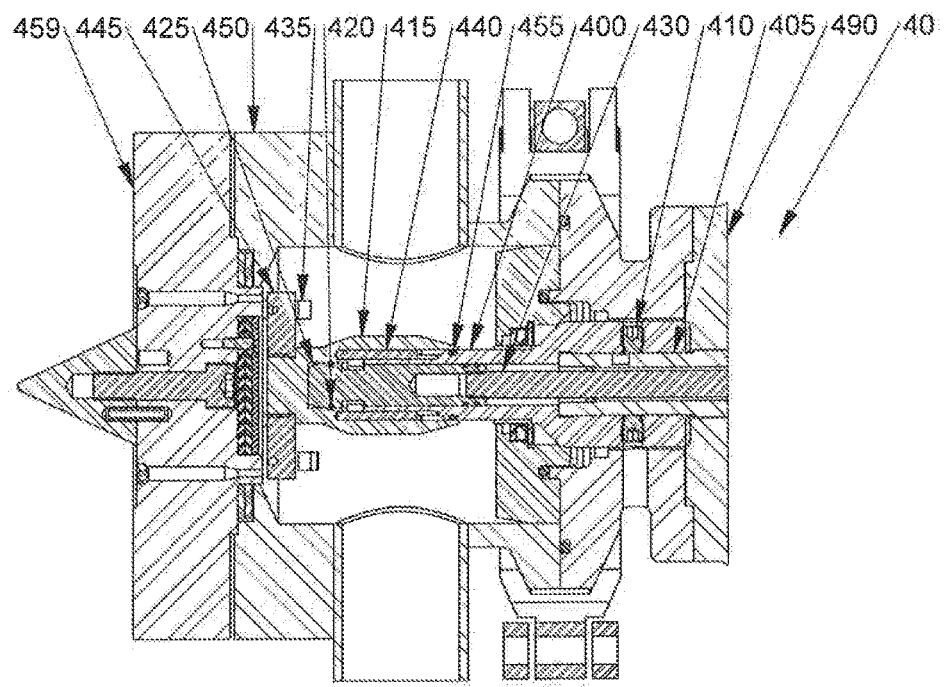
FIG. 4 is a partial section view of a second embodiment of a pelletizer in accordance with the present invention showing the relation of the cutter hub, blades, die plate, cutting chamber, front of the pelletizer motor, pelletizer shaft and motion rod, and quick disconnect hub.
Figure 9:
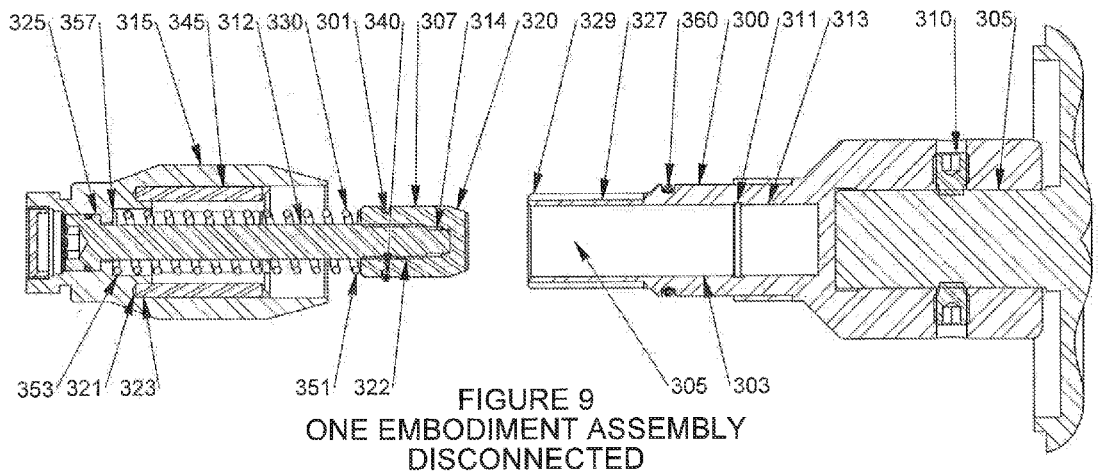
FIG. 9 is a sectional view of the cutter hub holder, pelletizer shaft and quick disconnect hub components of the first embodiment of the present invention shown in FIGS. 3 and 7 when the components are disconnected from one another.
Figure 10:
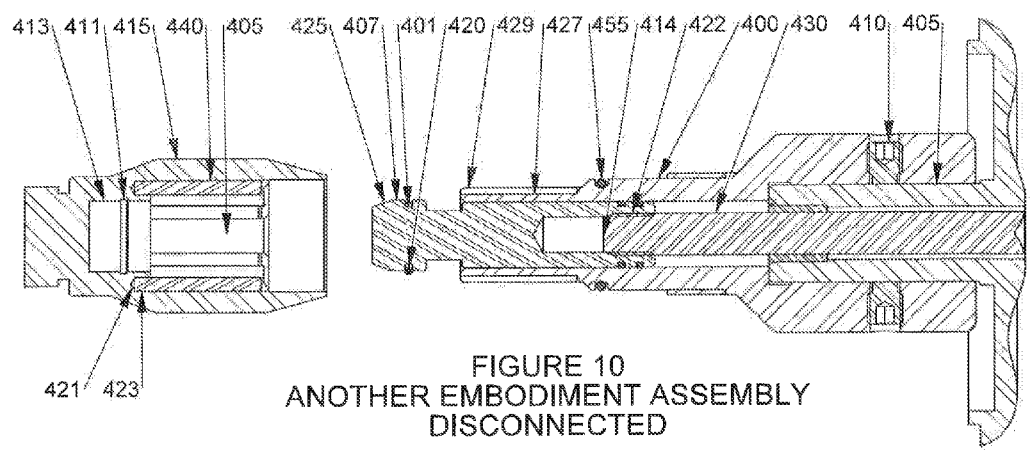
FIG. 10 is a sectional view of the cutter hub holder, pelletizer shaft and motion rod, and quick disconnect hub components of the second embodiment of the present invention shown in FIGS. 4 and 8 when the components are disconnected from one another.

The cutter hub pin drive mechanism includes multiple drive pins 345, with typically 6 to 12 being used depending upon various factors including but not limited to the model of the pelletizer, the power of the motor, space constraints and the diameter of the pelletizer shaft. The drive pins 345 ride in drive pin channels, generally designated by reference numeral 339, that are formed by longitudinally extending grooves 317 formed in an inner surface 319 of the cutter hub holder 315 and matching longitudinally extending grooves 327 formed in the outer surface 341 of the forward end 329 of the pelletizer shaft 300 and aligned with the cutter hub holder grooves 317 as shown in FIG. 7A and FIGS. 14-16. The forward ends 323 of the drive pins 345 are inserted in holes 321 at the bottom of the cutter hub holder 315 to retain the drive pins 345, and are preferably held with a press fit in the holes. Other holding mechanisms could also be used as would be understood by persons of ordinary skill in the art. In this way, the pins stay in engagement with the cutter hub holder when the cutter hub holder is disconnected from the pelletizer shaft. The use of the machined mating grooves 317, 327 and the drive pins positioned therein to drive the cutter hub holder 315 eliminates the need for a drive key weld of the type discussed in connection with the prior art FIG. 1 and FIG. 2 designs that sometimes failed and released the keys. As shown, the pins 345 and grooves 317, 327 extend parallel to the axis of the pelletizer shaft 300 and motor shaft 305 and are preferably evenly spaced around the inner surface of the cutter hub holder.

The drive pins 345 extend all the way into the bottom of the cutter hub holder 315 so that the forward ends 323 extend past the forward end 329 of the pelletizer shaft 300. This extension eliminates the wear problem in the prior art designs which resulted in the drive keys being caught within notches (not shown) formed in the outer surface 341 of the pelletizer shaft 300 and thus hindering or blocking movement of the cutter hub holder 315 to allow for adjustment of the blades 335.

The drive pins not only eliminate the need for welding as well as reducing the wear problem of the drive keys against the pelletizer shaft, but the drive pins also provide for a larger area of surface contact in the interface between the pins and the cutter hub holder grooves 317 and pelletizer shaft grooves 327. The cutter hub holder 315 and pelletizer shaft 300 can be machined with greater precision than is possible when welding the prior art drive keys in place, improving the interface of the shaft with the drive pins 345. As a result, torque transmission is greatly improved because all of the drive pins 345 are in contact with the pelletizer shaft 300 and therefore torque is distributed and does not fall onto only one or two of the drive elements.

Figure 14:
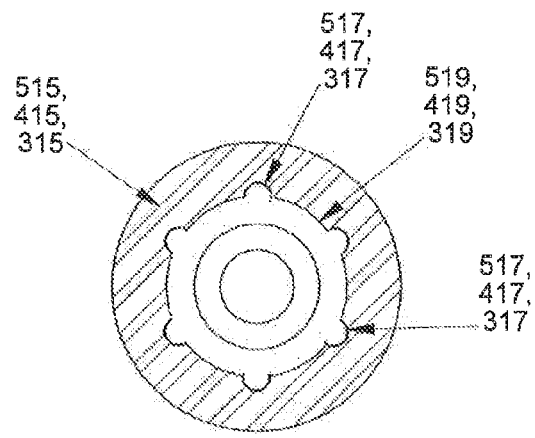
FIG. 14 is a cross-sectional view of a cutter hub holder having inner surface grooves according to the present invention.
Figure 15:
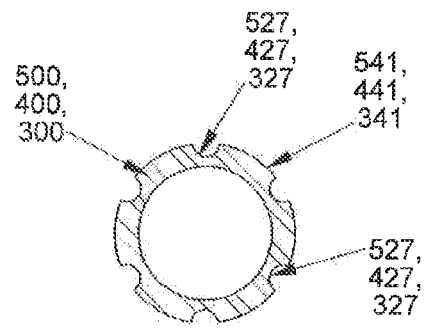
FIG. 15 is a cross-sectional view of a pelletizer shaft having outer surface grooves according to the present invention.
Figure 16:
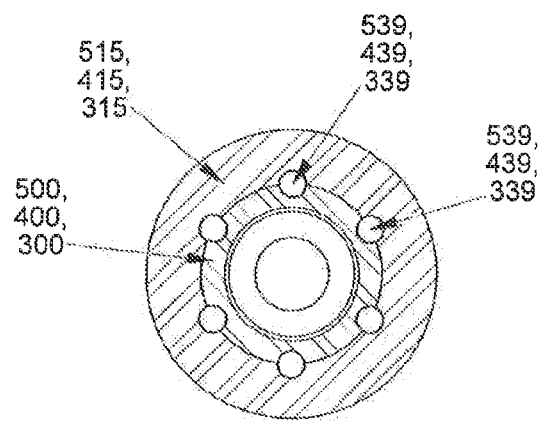
FIG. 16 is a cross-sectional view of the pelletizer shaft of FIG. 15 fitted within the cutter hub holder of FIG. 14 to form drive pin channels for a cutter hub pin drive mechanism according to the present invention.

In the embodiments shown herein, the drive pins are cylindrical with a circular cross-section as shown in FIGS. 7A, 8A and 12A. The grooves are therefore semi-circular so that when placed in abutment a cylindrical groove results with a circular cross-section as shown in FIGS. 14-16. However, pins having different cross-sectional shapes, such as square, hexagonal and the like, may be used provided the grooves are complementary in shape to the cross section of the pins.

To prevent the egress of fines into the area of the drive pins, the pelletizer according to the present invention further includes a sealing member 360, such as an o-ring, mounted on the pelletizer shaft 300 under the outer end of the cutter hub holder 315. The o-ring seals fluid and fines out of the drive pin area ensuring that fines do not accumulate or otherwise obstruct the free sliding relationship of the cutter hub relative to the pelletizer shaft that allows for smooth and unhindered adjustment of the position of the blades 335 against the cutting face of the die plate 359.

As shown, the cutter hub holder 315 in the first embodiment is coupled to the quick disconnect hub 320 via threads 322 on the end of the bolt 325. The disconnect hub 320 has a groove 301 formed in an outer surface 307 thereof (see FIG. 9). A retaining element such as a retainer ring 340 is held within the groove 301. The depth of the groove 301 is undersized with respect to the diameter of the retainer ring 340 so that the ring, while remaining captured in the groove 301 at all times, protrudes beyond an outer surface 307 of the disconnect hub 320 when the disconnect hub is separated from the pelletizer shaft. The shaft 300 has a bore 305 having an inner surface 303 with a groove 311 formed therein. As the disconnect hub is inserted into the bore 305 of the shaft, the retainer ring is compressed into the groove 301 through contact with the inner surface 303 of the shaft. When the disconnect hub is fully inserted, the retainer ring 340 reaches and snaps out into the pelletizer shaft groove 311 to couple the cutter hub holder 315 to the pelletizer shaft 300. While a retainer ring 340 is shown, other configurations of the retaining element are also considered to be within the scope of the present invention, including both reusable and frangible retaining elements.

The disconnect hub 320 is operative with the spring 330 that is secured to the cutter hub holder with a fastening element such as bolt 325 or the like. The rearward end 314 of the fastening element 325 is coupled to the quick disconnect hub 320. The spring 330 is fitted onto the shaft of the bolt 325 with a rearward end 351 of the spring being in abutment with the disconnect hub 320, and a forward end 353 of the spring being in abutment with an inwardly directed flange 357 on the cutter hub holder. The spring 330 exerts force to press the cutter hub 350 against the die plate 359 for adjustment of the cutter hub position as the blades 335 wear down.

Through the use of the disconnect hub 320 and retainer ring 340, if the cutter hub 350 gets wrapped up with polymer in the cutting chamber 355, the operator can more gently pull the pelletizer away by hand causing the retainer ring 340 to compress into slot 301 and disengage from the pelletizer shaft 300. Upon disengagement, the pelletizer can be pulled back from the cutting chamber 355 without damaging any components and leaving the cutting assembly including the cutter hub 350, cutter hub holder 315, disconnect hub 320, retainer ring 340, bolt 325, spring 330 and drive pins 345 inside the cutting chamber 355. The operator can then clean out the polymer wrap from the cutting chamber 355 and then reinsert the disconnect hub 320 of the cutting assembly into the bore 305 of the pelletizer shaft 300, making sure the disconnect hub 320 gets locked in place by the retainer ring 340 to lock the cutting assembly back in place on the pelletizer. The pelletizer can then be rolled back into the cutting chamber 355 and restarted.

A second embodiment of the present invention is shown in FIGS. 4, 8, 8A and 10. The pelletizer, generally designated by reference numeral 40, includes a pelletizer shaft 400 coupled to a motor shaft 405, a cutter hub 445 with cutter blades 435, a cutter hub holder 415, a cutting chamber 450, a die plate 459, a cutter hub pin drive mechanism including a plurality of drive pins 440, a sealing member 455, a quick disconnect hub 425 and a retainer ring 420. The pelletizer shaft 400 is bolted to the motor shaft 405 of motor 490 with set screws 410. The pelletizer shaft has a motion rod 430 that is threadedly coupled to the quick disconnect hub 425, with the connection between the hub 425 and the motion rod 430 then being used to secure the pelletizer shaft to the cutter hub holder 415 and cutter hub assembly.

As in the first embodiment, the cutter hub pin drive mechanism includes multiple drive pins 440, with typically 6 to 12 being used depending upon various factors including but not limited to the model of the pelletizer, the power of the motor, space constraints and the diameter of the pelletizer shaft. The drive pins ride in drive pin channels, generally designated by reference numeral 439, formed by longitudinally extending grooves 417 cut in the inner surface 419 of in the cutter hub holder 415 and corresponding longitudinally extending grooves 427 cut in the outer surface 441 of the pelletizer shaft 400 that are aligned with the cutter hub holder grooves 417 as shown in FIG. 8A and FIGS. 14-16. Capturing of the drive pins 440 in the drive pin channels 439 to transfer torque from the pelletizer shaft 400 to the cutter hub holder 415 eliminates the need for the weld that was required to secure the rectangular drive keys to the cutter hub holder in the prior art embodiments of FIGS. 1 and 2, previously described herein. As shown, the pins 440 and grooves 417, 427 extend parallel to the axis of the pelletizer shaft 400 and motor shaft 405 and are preferably equally spaced around the inner surface of the cutter hub holder.

As in the first embodiment of the present invention, the forward end 423 of the drive pins 440 extend beyond the forward end 429 of the pelletizer shaft 400 and are inserted in holes 421 at the bottom of the cutter hub holder 415 to retain the drive pins 440 in the cutter hub holder 415. The extension of the pins past the forward end of the pelletizer shaft 400 reduces the wear problem encountered with the prior art drive keys that would dig into the outer surface 441 of the pelletizer shaft and then "catch" on the notches (not shown) formed as a result of this wear pattern, preventing free movement of the cutter hub holder and cutter hub for blade position adjustment.

Also as in the first embodiment, the second embodiment of the pelletizer includes sealing member 455, such as an o-ring, placed around the pelletizer shaft 400 under the outer or rearward end of the cutter hub holder 415 to seal fluid and fines out of the drive pin area. By preventing the egress of fines and other contaminants into the drive pin area, the sealing member 455 ensures that fines do not accumulate or otherwise obstruct the free sliding relationship of the cutter hub 415 relative to the pelletizer shaft 400, which relationship allows for smooth adjustment of the position of the blades relative to the cutting face of the die plate.

The quick disconnect hub 425 is coupled, preferably by a threaded engagement, as at 422, to the forward end 414 of the motion rod 430. The motion rod is used to push and pull the cutter hub toward and away from the die plate 459 to adjust blade position with respect to the die plate 459 as the blades wear.

The disconnect hub 425 has a groove 401 formed in an outer surface 407 thereof. A retainer ring or snap ring 420 is captured within the groove 401. The depth of the groove 401 is undersized with respect to the diameter of the retainer ring 420 so that the ring, while remaining captured in the groove 401 at all times, protrudes beyond the outer surface 407 of the disconnect hub 425 when the disconnect hub is separated from the cutter hub holder 415. The cutter hub holder 415 has a bore 405 having an inner surface 413 with a circular groove 411 formed therein. As the disconnect hub is inserted into the bore 405 of the cutter hub holder 415, the ring 420 is compressed into the groove 401 through contact with the inner surface 413 of the cutter hub holder. When the disconnect hub is fully inserted, the retainer ring reaches and snaps into the cutter hub holder groove 411 to couple the cutter hub holder to the pelletizer shaft. While a snap ring 420 is shown, other configurations of the retaining element are also considered to be within the scope of the present invention, including both reusable and frangible retaining elements.

As also in the first embodiment, the separable connection between the disconnect hub 425 and the cutter hub holder 415 provides a simple means of separating the pelletizer shaft from the cutter hub holder if the cutter hub 445 gets wrapped up with polymer in the cutting chamber 450. The operator can manually pull the pelletizer away from the cutter hub holder 415, causing the retainer ring 420 to compress into groove 401 and disengage from the cutter hub holder 415 which allows the pelletizer to be pulled back from the cutting chamber 450 without damaging any components. The cutting assembly including the cutter hub 445, cutter hub holder 415, and drive pins 440 remain in the polymer inside the cutting chamber 450. The operator can then clean out the polymer wrap from the cutting chamber 450 and then reconnect the pelletizer shaft to the cutter hub holder 415 making sure the cutter hub holder 415 gets locked in place by the retainer ring 420 to the disconnect hub 425 to lock the cutting assembly back in place on the pelletizer. The pelletizer can then be rolled back into the cutting chamber and restarted.

A third embodiment of the present invention is shown in FIGS. 11, 12, 12A and 13. The pelletizer, generally designated by reference numeral 50, includes a pelletizer shaft 500 with a motion rod 520 coupled to a motor shaft 505, a cutter hub 540 with cutter blades 530, a cutter hub holder 515, a cutting chamber 545, a die plate 559, a cutter hub pin drive mechanism including a plurality of drive pins 535, and a sealing member 550. The pelletizer shaft 500 is bolted to the motor shaft 505 of motor 590 with set screws 510. The cutter hub holder 515 is retained on the pelletizer shaft 500 through threaded engagement with the motion rod 520. The motion rod 520 is used to adjust and fix the position of the cutter hub 540 relative to the die plate 559 as the blades 530 wear down. Once the motion rod is positioned as desired, the set screw 525 is used to secure the motion rod to the cutter hub holder.

Like the first and second embodiments, the cutter hub pin drive mechanism includes multiple drive pins 535, with typically 6 to 12 being used depending upon various factors including but not limited to the model of the pelletizer, the power of the motor, space constraints and the diameter of the pelletizer shaft. The drive pins ride in drive pin channels, generally designated by reference numeral 539, formed by longitudinally extending grooves 517 in the inner surface 519 of the cutter hub holder 515 and corresponding longitudinally extending grooves 527 in the outer surface 541 of the pelletizer shaft as shown in FIG. 12A and FIGS. 14-16. The forward ends 523 of the drive pins 535 and are inserted in holes 521 at the bottom of the cutter hub holder 515 to retain the drive pins 535 in the cutter hub holder, again eliminating the need for any welding of the pins to the cutter hub holder. The pins extend past the forward end 529 of the pelletizer shaft 500 which reduces the prior art wear pattern in the pelletizer shaft that resulted in obstructed movement of the cutter hub holder. As shown, the pin 535 and grooves 517, 527 extend parallel to the axis of the pelletizer shaft 500 and motor shaft 505 and are preferably equally spaced around the inner surface of the cutter hub holder.

Also like the first two embodiments, the third embodiment includes the sealing member 550, which may be embodied as an o-ring, on the pelletizer shaft 500 under the outer or rearward end of the cutter hub holder 515 to seal fluid and fines out of the drive pin area as has already been described herein.

As shown herein, the third embodiment does not include a quick disconnect hub. However, the structure shown in FIGS. 11-13 could be modified in a manner like that shown in FIGS. 4, 8 and 10 of the second embodiment to include a quick disconnect hub feature if desired.

Figure 11:
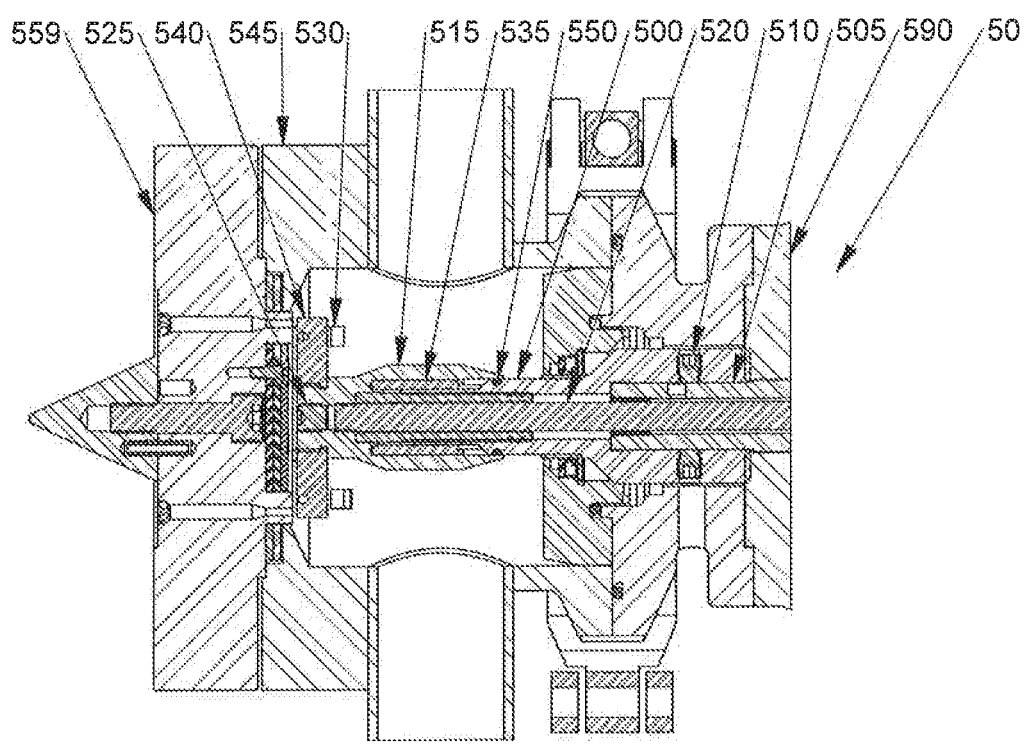
FIG. 11 is an assembled sectional view of a third embodiment of the present invention, that does not include a disconnect hub, showing the relation of the cutter hub, blades, die plate, cutting chamber, front of the pelletizer motor, and pelletizer shaft and motion rod.

In the absence of a quick disconnect hub, as in the embodiment shown in FIGS. 11-13, if the cutter hub 540 gets wrapped up with polymer in the cutting chamber 545, the operator must remove the motor fan cover (not shown) on the back of the motor 590 and disconnect the motion rod 520 from the motion rod holder (not shown). The operator then unscrews the motion rod 520 from the cutter hub holder 515, leaving the cutter hub 540, cutter hub holder 515 and drive pins 535 as a cutting assembly in the polymer inside the cutting chamber 545. The operator can then clean out the polymer wrap from the cutting chamber 545, reinsert the cutting assembly onto the pelletizer shaft 500, screw the motion rod 520 back into the cutter hub holder 515, and tighten the set screw 525. The motion rod is then reconnected to the motion rod holder (not shown) and the fan cover (not shown) is reinstalled on the back of the motor. The pelletizer can then be rolled back into the cutting chamber 545 and restarted.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A cutter hub pin drive mechanism for a pelletizer comprising:
    a cutter hub holder having a plurality of grooves in an inner surface thereof;
    a cutter hub having a plurality of blades, said cutter hub coupled to said cutter hub holder;
    a pelletizer shaft powered by a motor for rotational movement, said pelletizer shaft having an outer surface with a plurality of grooves therein, said pelletizer shaft grooves in alignment with said cutter hub holder grooves to form longitudinally extending drive pin channels; and
    a plurality of elongated drive pins captured within said drive pin channels, said drive pins transferring torque from rotation of said pelletizer shaft to said cutter hub holder and cutter hub with said blades.

2. The cutter hub pin drive mechanism for a pelletizer as set forth in claim 1, wherein forward ends of said drive pins extend beyond a forward end of said pelletizer shaft, said drive pin forward ends being inserted in holes in said cutter hub holder.

3. The cutter hub pin drive mechanism for a pelletizer as set forth in claim 2, wherein said pins are held in said holes with a press fit.

4. The cutter hub pin drive mechanism for a pelletizer as set forth in claim 1, further comprising a sealing member fitted around said pelletizer shaft and positioned under said cutter hub holder to seal fluid and fines from an area containing said drive pins.

5. The cutter hub pin drive mechanism for a pelletizer as set forth in claim 4, wherein said sealing member is an o-ring.

6. The cutter hub pin drive mechanism for a pelletizer as set forth in claim 1, further comprising a quick disconnect hub configured to removably couple the pelletizer shaft to the cutter hub holder, said quick disconnect hub secured by a retaining element that is engaged with the quick disconnect hub to couple the pelletizer shaft and the cutter hub holder, and disengaged from the quick disconnect hub to separate the pelletizer shaft from the cutter hub holder.

7. The cutter hub pin drive mechanism for a pelletizer as set forth in claim 6, further comprising a spring held within the cutter hub holder by a fastening element, said quick disconnect hub being mounted on a rearward end of said fastening element and being removable from said pelletizer shaft with said cutter hub holder, said quick disconnect hub including a retaining element that removably secures the quick disconnect hub to said pelletizer shaft.

8. The cutter hub pin drive mechanism for a pelletizer as set forth in claim 7, wherein said quick disconnect hub has a groove formed in an outer surface thereof, said retaining element including a retaining ring that fits within said groove, said groove being undersized with respect to a diameter of said retaining element, said pelletizer shaft having an inner surface with a groove into which the retaining ring is received to couple the cutter hub holder to the pelletizer shaft.

9. The cutter hub pin drive mechanism for a pelletizer as set forth in claim 6, further comprising a motion rod within the pelletizer shaft, said motion rod being threadedly engaged with said quick disconnect hub and operative to couple the cutter hub holder to the pelletizer shaft.

10. The cutter hub pin drive mechanism for a pelletizer as set forth in claim 9, wherein said quick disconnect hub has a groove formed in an outer surface thereof, said retaining element including a retaining ring that is captured within said groove, said groove being undersized with respect to a diameter of said ring, said ring engaging within a groove in an inner surface of said cutter hub holder to couple the pelletizer shaft to the cutter hub holder.

11. The cutter hub pin drive mechanism for a pelletizer as set forth in claim 10, wherein said retaining element includes a snap ring.

12. The cutter hub pin drive mechanism for a pelletizer as set forth in claim 1, wherein said elongated drive pins are cylindrical.

13. The cutter hub pin drive mechanism for a pelletizer as set forth in claim 1, further comprising a motion rod within the pelletizer shaft, said motion rod being threadedly engaged with said cutter hub holder to couple said pelletizer shaft to said cutter hub holder, said motion rod extending beyond a forward end of said pelletizer shaft and being fixed to the cutter hub holder by a set screw.

14. An underfluid pelletizer for extruding and cutting a process melt into pellets using a pelletizer comprising:
    a pelletizer shaft rotationally driven by a motor, said shaft having a plurality of grooves formed in an outer surface thereof;

a die plate with a plurality of extrusion orifices formed therein through which the process melt is carried from said die plate to a cutting face on a downstream side of said die plate;

a rotary cutter blade assembly in opposed relation to said cutting face, said cutter blade assembly having a cutter hub and at least one cutter blade mounted on said cutter hub and capable of moving in a plane generally parallel to and closely adjacent said cutting face to cut strands of process melt extruded through said orifices into pellets, said rotary cutter blade assembly being driven by rotational movement of said pelletizer shaft, said cutter hub being coupled to a cutter hub holder having a plurality of grooves in an inner surface thereof, said cutter hub holder grooves being in alignment with said pelletizer shaft grooves to form longitudinally extending drive pin channels;

a plurality of drive pins captured within said drive pin channels, said drive pins transferring torque from rotation of said pelletizer shaft to said cutter hub holder and cutter blade assembly; and a cutting chamber enclosing said cutting face and cutter blade assembly, said cutting chamber including a fluid inlet for introducing cooling fluid into the cutting chamber and an outlet for discharge of fluid and pellets entrained in the fluid.

15. The pelletizer as set forth in claim 14, wherein forward ends of said drive pins extend beyond a forward end of said pelletizer shaft, said drive pin forward ends being inserted in holes in said cutter hub holder.

16. The pelletizer as set forth in claim 15, wherein said pins are held in said holes with a press fit.

17. The pelletizer as set forth in claim 14, further comprising a sealing member fitted around said pelletizer shaft and positioned under said cutter hub holder to seal fluid and fines from an area containing said drive pins.

18. The pelletizer as set forth in claim 17, wherein said sealing member is an o-ring.

19. The pelletizer as set forth in claim 14, further comprising a quick disconnect hub configured to removably couple the pelletizer shaft to the cutter hub holder.

20. The pelletizer as set forth in claim 19, further comprising a spring held within the cutter hub holder by a fastening element, said quick disconnect hub being mounted on rearward end of said fastening element and being removable from said pelletizer shaft with said cutter hub holder, said quick disconnect hub including a retaining element that removably secures the quick disconnect hub to said pelletizer shaft.

21. The pelletizer as set forth in claim 19, further comprising a motion rod within the pelletizer shaft that is coupled to the quick disconnect hub, said motion rod being threadedly engaged with said quick disconnect hub.

22. The pelletizer as set forth in claim 21, wherein said quick disconnect hub has a groove formed in an outer surface thereof, a retaining element being captured in said groove and operative to engage with a groove in an inner surface of the cutter hub holder when the pelletizer shaft is coupled to the cutter hub holder.

23. An underfluid pelletizer for extruding and cutting a process melt into pellets using a pelletizer comprising:

a pelletizer shaft rotationally driven by a motor;

a die plate with a plurality of extrusion orifices formed therein through which the process melt is carried from said die plate to a cutting face on a downstream side of said die plate;

a rotary cutter blade assembly in opposed relation to said cutting face, said cutter blade assembly having a cutter hub and at least one cutter blade mounted on said cutter hub and capable of moving in a plane generally parallel to and closely adjacent said cutting face to cut strands of process melt extruded through said orifices into pellets, said rotary cutter blade assembly being driven by rotational movement of said pelletizer shaft, said cutter hub being coupled to a cutter hub holder;

a cutter hub drive mechanism for transferring torque from rotation of said pelletizer shaft to said cutter hub holder and cutter blade assembly, said cutter hub drive mechanism including a plurality of longitudinally extending grooves in an inner surface of said cutter hub holder, a plurality of longitudinally extending grooves in an outer surface of said pelletizer shaft in alignment with said cutter hub holder grooves to define longitudinally extending drive pin channels, and a plurality of drive pins captured within said drive pin channels, said drive pins transferring torque from rotation of said pelletizer shaft to said cutter hub holder and cutter hub;

a cutting chamber enclosing said cutting face and cutter blade assembly, said cutting chamber including a fluid inlet for introducing cooling fluid into the cutting chamber and an outlet for discharge of fluid and pellets entrained in the fluid; and a quick disconnect hub configured to removably couple the pelletizer shaft to the cutter hub holder, said quick disconnect hub secured by a retaining element that is engaged within a quick disconnect groove in the pelletizer shaft to removably couple the pelletizer shaft and the cutter hub holder.

24. An underfluid pelletizer for extruding and cutting a process melt into pellets using a pelletizer comprising:

a pelletizer shaft rotationally driven by a motor;

a die plate with a plurality of extrusion orifices formed therein through which the process melt is carried from said die plate to a cutting face on a downstream side of said die plate;

a rotary cutter blade assembly in opposed relation to said cutting face, said cutter blade assembly having a cutter hub and at least one cutter blade mounted on said cutter hub and capable of moving in a plane generally parallel to and closely adjacent said cutting face to cut strands of process melt extruded through said orifices into pellets, said rotary cutter blade assembly being driven by rotational movement of said pelletizer shaft, said cutter hub being coupled to a cutter hub holder;

a cutter hub drive mechanism for transferring torque from rotation of said pelletizer shaft to said cutter hub holder and cutter blade assembly;

a cutting chamber enclosing said cutting face and cutter blade assembly, said cutting chamber including a fluid inlet for introducing cooling fluid into the cutting chamber and an outlet for discharge of fluid and pellets entrained in the fluid;

a quick disconnect hub configured to removably couple the pelletizer shaft to the cutter hub holder, said quick disconnect hub secured by a retaining element that is engaged within a quick disconnect groove in the pelletizer shaft to removably couple the pelletizer shaft and the cutter hub holder; and a sealing member fitted around said pelletizer shaft and positioned under said cutter hub holder to seal fluid and fines from an area containing said cutter hub drive mechanism.

25. An underfluid pelletizer for extruding and cutting a process melt into pellets using a pelletizer comprising:
- a pelletizer shaft rotationally driven by a motor;
- a die plate with a plurality of extrusion orifices formed therein through which the process melt is carried from said die plate to a cutting face on a downstream side of said die plate;
- a rotary cutter blade assembly in opposed relation to said cutting face, said cutter blade assembly having a cutter hub and at least one cutter blade mounted on said cutter hub and capable of moving in a plane generally parallel to and closely adjacent to said cutting face to cut strands of process melt extruded through said orifices into pellets, said rotary cutter blade assembly being driven by rotational movement of said pelletizer shaft, said cutter hub being coupled to a cutter hub holder;
- a cutter hub drive mechanism for transferring torque from rotation of said pelletizer shaft to said cutter hub holder and cutter blade assembly;
- a cutting chamber enclosing said cutting face and cutter blade assembly, said cutting chamber including a fluid inlet for introducing cooling fluid into the cutting chamber and an outlet for discharge of fluid and pellets entrained in the fluid; and
- a sealing member fitted around said pelletizer shaft and positioned under said cutter hub holder to seal fluid and fines from an area containing said cutter hub drive mechanism.

26. The pelletizer as set forth in claim 25, wherein said cutter hub drive mechanism includes a plurality of longitudinally extending grooves in an inner surface of said cutter hub holder, a plurality of longitudinally extending grooves in an outer surface of said pelletizer shaft in alignment with said cutter hub holder grooves to define longitudinally extending drive pin channels, and a plurality of drive pins captured within said drive pin channels, said drive pins transferring torque from rotation of said pelletizer shaft to said cutter hub holder and cutter hub.

27. The pelletizer as set forth in claim 25, further comprising a quick disconnect hub configured to removably couple the pelletizer shaft to the cutter hub holder, said quick disconnect hub secured by a retaining element that is engaged within a quick disconnect groove in the pelletizer shaft to removably couple the pelletizer shaft and the cutter hub holder.

* * * * *